Oct. 19, 1948.                    H. KLEMPERER                    2,451,496
                                  WELDING SYSTEM
                                Filed Feb. 26, 1946

INVENTOR
HANS KLEMPERER
BY
ATTY.

Patented Oct. 19, 1948

2,451,496

UNITED STATES PATENT OFFICE 2,451,496

WELDING SYSTEM

Hans Klemperer, Belmont, Mass., assignor to Raytheon Manufacturing Company, Newton, Mass., a corporation of Delaware Application February 26, 1946, Serial No. 650,357

2 Claims. (Cl. 219—4)

This invention relates to welding systems of the type in which a controlled impulse of electrical energy is discharged through a welding load.

In systems of the type to which the invention relates, electrical energy from a suitable source is stored in one or more condensers and subsequently discharged into the welding load by way of a suitable connecting circuit.

As disclosed in my copending application, Serial No. 316,798, filed February 1, 1940, it is desirable in welding certain types of metal, especially aluminum, to supply the welding energy in the form of a sharply rising pulse of current which is then maintained at a high value for a sufficient length of time to cause the weld to be made, after which the current falls off in a sufficiently short period of time to permit the welding electrodes to be opened without danger of pitting the work surface. The usual wave form of the discharge of a condenser, whether this discharge be oscillatory or non-oscillatory, does not conform to the desired wave shape for welding such materials. For this reason it has been proposed to discharge a plurality of condensers in rapid succession through the load circuit in order to maintain the current at the relatively high value desired for a sufficient length of time. Heretofore this has required special timing means, to so time the discharge of the condensers that upon the discharge of the first condenser the next succeeding condenser is automatically discharged to maintain the high current level through the work.

It is among the objects of the present invention to provide an arrangement in which the proper amount of energy is delivered to the welding load in the desired wave form without the necessity for introducing a plurality of control devices for timing the discharge of each of a plurality of condensers.

Another object of the present invention is to provide a welding system in which the current delivered to the load is delivered as a current impulse having a substantially rectangular wave form.

The foregoing and other objects and features of this invention will be made fully apparent to those skilled in the art from a consideration of the following detailed description taken in conjunction with the accompanying drawing in which.

Figure 1:
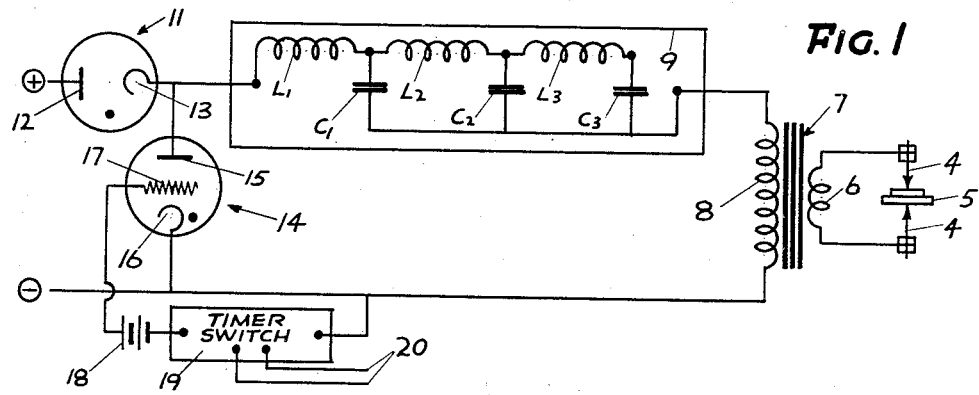
Fig. 1 is a circuit diagram of a welding system embodying the invention.

Referring to the drawing, and first to Fig. 1 thereof, reference numeral 4 indicates a pair of welding electrodes adapted to close upon the work 5. The electrodes 4 are energized from the secondary winding 6 of a welding transformer 7 having a primary winding 8. The energy necessary to accomplish the welding operation is adapted to be supplied to the primary winding 8 from a pulse-forming line or equivalent wave-shaping network 9. The wave-shaping network 9 may be constructed in any suitable manner and provides a capacity for storing energy. In the form shown condensers $C_1$, $C_2$ and $C_3$ function as an energy storing capacity distributed throughout the network and also function in conjunction with the inductances $L_1$, $L_2$ and $L_3$ for generating a substantially rectangular wave.

The energy-storing capacitance of the wave-shaping network 9 is adapted to be charged from a suitable source of direct current which may include a rectifier tube 11 having its anode 12 connected to the positive terminal of the source and its cathode 13 connected to one side of the wave-shaping network 9. The negative terminal of the source may be connected to the opposite side of the wave-shaping network 9 through the primary winding 8 of the welding transformer 7. The discharge of the capacitance of the wave-shaping network 9 through the primary winding 8 of the welding transformer is timed by a controlled gaseous discharge device 14, such as a thyratron, having its anode 15 connected to the positive side of the capacitance of the wave-shaping network and its cathode 16 connected through the primary winding 8 to the negative side of said capacitance. A control grid 17 of the tube 14 is adapted to be driven positive relative to the cathode of said tube by a battery 18, the cathode-grid circuit being controlled by a timer switch 19 adapted to be closed upon the closure of the electrodes 4 upon the work 5. The timer switch 19 is adapted to be energized by impulses received from a circuit 20 which circuit may be controlled in a known manner by the closure of the electrodes 4 on the work 5.

Figure 2:
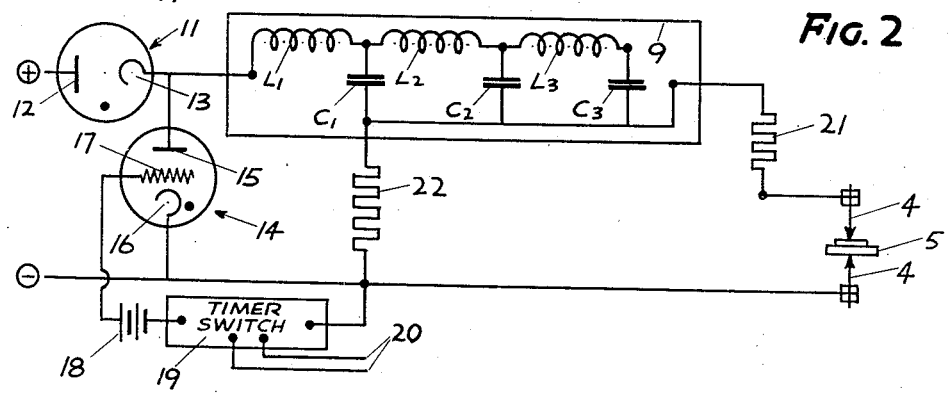
Fig. 2 is a similar diagram representing an alternative form of the invention.

As shown in Fig. 2, where the same reference numerals refer to the corresponding parts of Fig. 1, the capacitance of the wave-forming network 9 may be connected for discharge directly through the welding electrodes 4 without the interpositioning of the transformer 7. In either event the impedance of the welding load will be matched to the impedance of the pulse line. Where the capacitance is discharged directly through the welding load, as in the form shown in Fig. 2, the matching of the impedance may be obtained by interposing a suitable resistance 21 in the discharge circuit such that this resistance, together with the resistance of the welding load, matches the impedance of the wave-shaping network. Where the capacitance of the wave-shaping network is discharged into a welding transformer, the impedance matching may be obtained by a proper selection of the turn ratio of the welding transformer 7.

This turn ratio may be determined by the formula $$n^2 = \sqrt{\frac{L}{\frac{C}{R}}}$$

where $n$ is the turn ratio.

It will be seen that the charging of the capacitance of the wave-shaping network through the primary winding 8 of the transformer 7 occurs in the opposite direction to the discharge of this capacitance therethrough, and thus tends to reset the flux in the transformer. The charging of the capacitance in the wave-shaping network in the form of the invention shown in Fig. 2 may be effected through the welding electrodes by a preliminary closure of these upon the work or it may be effected through a suitable resistor 22 at a time when the electrodes 4 are open.

Figure 3:
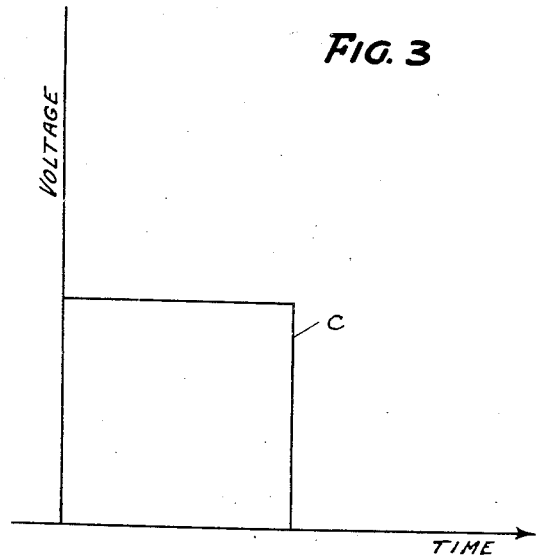
Fig. 3 shows a curve useful in explaining certain operating characteristics of the invention.

The operation of the system will be more fully understood from a consideration of the curve shown in Fig. 3 in which the wave-shape of the voltage supplied to the load is plotted against time. It will be understood that the curve is not intended to indicate qualitatively the aspects of such a discharge but it does indicate in a general quantitative manner the wave form of the discharge of the pulse-forming line.

By utilizing the capacitance of a wave-shaping network as the source of the stored energy for the welding impulse, a substantially rectangular wave form of the type shown at $c$ may be obtained. Due to the fact that the current is supplied at a comparatively high constant level represented by the flat top portion of the curve $c$, the energy supplied to the welding load need persist for only a relatively short period, after which the current drops sharply to zero and accordingly the welding electrodes may be removed from the work without waiting for a substantial period during which the welding energy decays through the load. The desired energy level for any particular material to be welded will be chosen by a proper selection of the parameters of the wave-forming network. The system, therefore, not only permits a more rapid operation in effecting a plurality of successive welds, but also provides a more ideal wave form for the welding energy which is particularly desirable in the welding of certain materials.

While there have been herein described certain preferred embodiments of the invention, other embodiments within the scope of the appended claims will be apparent to those skilled in the art from a consideration of the forms shown and the teachings hereof.

What is claimed is:

1. A welding system comprising a pulse-forming line consisting of a plurality of interconnected capacitors with an inductance connected between each pair of capacitors, means for supplying current to said pulse line to store electrical energy in said capacitors, a welding load circuit, and means to discharge said pulse-forming line into said welding load circuit, whereby a welding current impulse of substantially rectangular waveshape and of predetermined duration is supplied to said welding load circuit.

2. A welding system comprising a pulse-forming line consisting of a plurality of interconnected capacitors with an inductance connected between each pair of capacitors, means for supplying current to said pulse line to store electrical energy in said capacitors, a welding load circuit, and means to discharge said pulse-forming line into said welding load circuit, said welding load circuit having an impedance which matches the impedance of said pulse-forming line, whereby a welding current impulse of substantially rectangular waveshape and of predetermined duration is supplied to said welding load circuit.

HANS KLEMPERER.

REFERENCES CITED

The following references are of record in the file of this patent:

UNITED STATES PATENTS

| Number | Name | Date |
|---|---|---|
| 2,184,628 | Watson et al. | Dec. 26, 1939 |
| 2,359,178 | White | Sept. 26, 1944 |

FOREIGN PATENTS

| Number | Country | Date |
|---|---|---|
| 548,618 | Great Britain | Oct. 16, 1942 |